US007967154B1

(12) United States Patent
Sharon

(10) Patent No.: US 7,967,154 B1
(45) Date of Patent: Jun. 28, 2011

(54) SYSTEM FOR SUPPORTING AND DISPLAYING PRODUCTS IN CONTAINERS

(76) Inventor: Arie Sharon, Richardson, TX (US)

( * ) Notice: Subject to any disclaimer, the term of this patent is extended or adjusted under 35 U.S.C. 154(b) by 652 days.

(21) Appl. No.: 11/904,523

(22) Filed: Sep. 26, 2007

Related U.S. Application Data

(60) Provisional application No. 60/846,986, filed on Sep. 26, 2006.

(51) Int. Cl.
A47J 47/00 (2006.01)
(52) U.S. Cl. .................... 211/126.16; 211/72
(58) Field of Classification Search ............ 206/736, 206/740, 730; 211/72, 73, 126.16, 71.01, 211/135; 220/72; 248/152, 154, 174, 300
See application file for complete search history.

(56) References Cited

U.S. PATENT DOCUMENTS

| 570,408 | A | * | 10/1896 | Jones ............................ 206/476 |
| 768,007 | A | * | 8/1904 | Weissenstein ................ 131/239 |
| 1,471,310 | A | * | 10/1923 | Kohl ............................ 248/452 |
| 1,487,049 | A | * | 3/1924 | Dietsche, Jr ................ 248/152 |
| 1,549,111 | A | * | 8/1925 | Grollman ..................... 206/479 |
| 1,881,707 | A | * | 10/1932 | Larkin ........................... 211/73 |
| 1,909,543 | A | * | 5/1933 | Jordan .......................... 211/73 |
| 2,043,070 | A | * | 6/1936 | Rutkowski .................... 206/482 |
| 2,058,542 | A | * | 10/1936 | Wise ............................ 206/482 |
| 2,135,093 | A | * | 11/1938 | Abrams ........................ 248/152 |
| 2,743,021 | A | * | 4/1956 | Glenn ........................... 211/72 |
| 2,940,710 | A | * | 6/1960 | Adams .......................... 248/174 |
| 3,069,019 | A | * | 12/1962 | Schuster ....................... 211/73 |
| 5,042,651 | A | * | 8/1991 | Davis et al. ................. 211/132.1 |
| 5,183,166 | A | * | 2/1993 | Belokin et al. .............. 211/149 |
| 6,068,140 | A | * | 5/2000 | Mangrum et al. ........ 211/132.1 |
| 6,098,820 | A | * | 8/2000 | Smith ........................ 211/132.1 |
| 6,378,710 | B1 | * | 4/2002 | Grueneberg ............... 211/132.1 |
| 6,929,133 | B1 | * | 8/2005 | Knapp et al. ................ 211/118 |
| 6,966,447 | B2 | * | 11/2005 | Hiltke et al. .............. 211/132.1 |
| 2005/0006329 | A1 | * | 1/2005 | Williquette .................. 211/113 |
| 2005/0184015 | A1 | * | 8/2005 | Cypranowski et al. ....... 211/73 |
| 2008/0083682 | A1 | * | 4/2008 | Moss et al. .................. 211/72 |

* cited by examiner

Primary Examiner — Jennifer E. Novosad
(74) Attorney, Agent, or Firm — Kenneth A. Roddy

(57) ABSTRACT

A display support system for releasably supporting a plurality of product-containing containers for display and sales of the products contained therein. The system includes at least one container having an open top end, a bottom end wall, and at least one generally vertical side wall adjoined to the bottom end wall defining a bottom corner and the open top end and forming an interior for containing a plurality of products; and a product display adapted to be supported on a flat surface, which may be formed of cardboard or wire rod. The display has at least one depending retention member for releasably receiving and engaging the top end of the container side wall, and at least one corner support member disposed a distance vertically below a respective retention member having a protruding support surface for receiving and supporting the bottom corner and a portion of the bottom end of the container having its side wall engaged with the retention member.

10 Claims, 13 Drawing Sheets

SYSTEM FOR SUPPORTING AND DISPLAYING PRODUCTS IN CONTAINERS

CROSS REFERENCE TO RELATED APPLICATION

This application claims priority of U.S. Provisional Application Ser. No. 60/846,986, filed Sep. 26, 2006.

BACKGROUND OF THE INVENTION

1. Field of the Invention

This invention relates generally to display apparatus and systems for supporting, displaying and dispensing goods, and more particularly to a display system for removably supporting a plurality of individual product-containing containers for display and sale of the products contained therein.

2. Background Art

Display structures, racks and cartons formed from corrugated board, sometimes referred to as "point of purchase" (POP) displays are widely used in retail establishments for displaying merchandise. The corrugated boards used to form the POP display structures, racks, and cartons are typically die cut from corrugated board and are foldable from an initially flat state to an assembled state for use. Conventional freestanding floor-supported POP display racks are typically constructed to form several tiers of shelves when assembled for holding various merchandise or goods, such as packaged snacks, CD's, books and the like.

Conventional POP display cartons are adapted to contain a plurality of "impulse" type items such as bottles of aspirin, candy, gum or the like and a generally placed in a countertop or rack adjacent to the cash register. The display cartons generally comprise, in their assembled state, a bottom wall, a pair of opposed side walls, a front wall and a rear wall. The top of the display carton is open and the front wall of the display carton is normally of a height that is considerably less than a height of the rear wall of the carton. In this manner, a customer can view the products contained within the display carton and access the products from the front of the display carton to thereby remove one of the plurality of products for purchase. Often, the wholesaler or manufacturer will ship the display carton to a retailer in its assembled state with the products preloaded in the carton. When the display carton is shipped in this manner a shrink fit piece of cellophane or the like is wrapped around the display carton to maintain the products securely in the carton during shipping. Once the display carton and products arrive at the retail establishment, the retailer can simply remove the cellophane and place the display cartons on a shelf or on a specifically designed rack for holding a plurality of cartons for sale of the products.

Typically, various packaged goods and products, e.g., snack food products such as potato chips, cookies and the like, are aligned on for display on fixed showcase shelves or freestanding racks in stores. However, the individually packaged goods need to be manually placed on the showcase shelves or racks bag by bag, which consumes considerable time and expense. Another disadvantage is that the packaged goods are only displayed on predetermined showcase shelves with similar goods, and consequently the variety of types of products or goods that can be displayed in close proximity is limited.

It is also common in the art to affix the packages of these types of goods and products to a carrier strip or display card that may be displayed in the store, whereby the customer can manually remove a package from the carrier strip or card. One of the primary attributes of such display strip and card systems is their suitability for use in a retail establishment with limited space because they are considerably smaller than conventional product display racks. Such carrier strips and card displays may be positioned adjacent to a counter or on a counter or suspended from a shelf other suitable support. However, because they are considerably smaller than conventional product display racks, only a limited number of packaged goods can be accommodated.

Another conventional method for attaching packaged goods to a carrier strip or display card is by attaching the end seal or flange of a package or bag utilizing fasteners or adhesive. However, this method is also time consuming and expensive, and there is always a possibility that the seal, the package, or the packaged goods, may be damaged when the customer attempts to manually remove the package from the carrier strip or card. Another disadvantage is that the entire display may be pulled down or fall over when the customer attempts to manually remove the package from the carrier strip or card.

SUMMARY OF THE INVENTION

The present invention overcomes the aforementioned problems and is distinguished over the prior art in general, and these patents in particular by a display support system for releasably supporting a plurality of product-containing containers for display and sales of the products contained therein. The system includes at least one container having an open top end, a bottom end wall, and at least one generally vertical side wall adjoined to the bottom end wall defining a bottom corner and the open top end and forming an interior for containing a plurality of products; and a product display adapted to be supported on a flat surface, which may be formed of cardboard or wire rod. The display has at least one depending retention member for releasably receiving and engaging the top end of the container side wall, and at least one corner support member disposed a distance vertically below a respective retention member having a protruding support surface for receiving and supporting the bottom corner and a portion of the bottom end of the container having its side wall engaged with the retention member.

One of the features and advantages of the present support and display system is that it will removably support a plurality of individual product-containing containers, which may be of the same size or different sizes, each containing a plurality of products for display and sale of the products contained therein.

Another feature and advantage of the present support and display system is that it eliminates the time consuming and expensive task of manually placing various individual products, such as packaged goods, snack food products, potato chips, cookies and the like on showcase shelves or racks bag by bag.

Another feature and advantage of the present support and display system is that it allows a large number of various different kinds of products, such as packaged goods, snack food products, potato chips, cookies and the like, to be positioned for display and sale in close proximity.

Another feature and advantage of the present support and display system is that it supports a plurality of individual containers that may contain a plurality of prepackaged food products, such as snack foods, potato chips, cookies and the like, for display and dispensing, whereby the customer can manually remove an individual packaged product from the supported container, thereby significantly reducing the possibility of damage to the seal of the package, the package, and the packaged products when the customer removes the packaged product from the supported container.

A further feature and advantage of the present support and display system is that it supports a plurality of individual product-containing containers in a secure manner, thereby significantly reducing the possibility of the entire display being pulled down or falling over when the customer manually removes a product from the supported container.

A still further feature and advantage of the present support and display system is that it is of simple and strong construction, and inexpensive to manufacture.

Other significant features and advantages of the present invention will become apparent from time to time throughout the specification and claims as hereinafter related.

DESCRIPTION OF THE PREFERRED EMBODIMENTS

Figure 1:
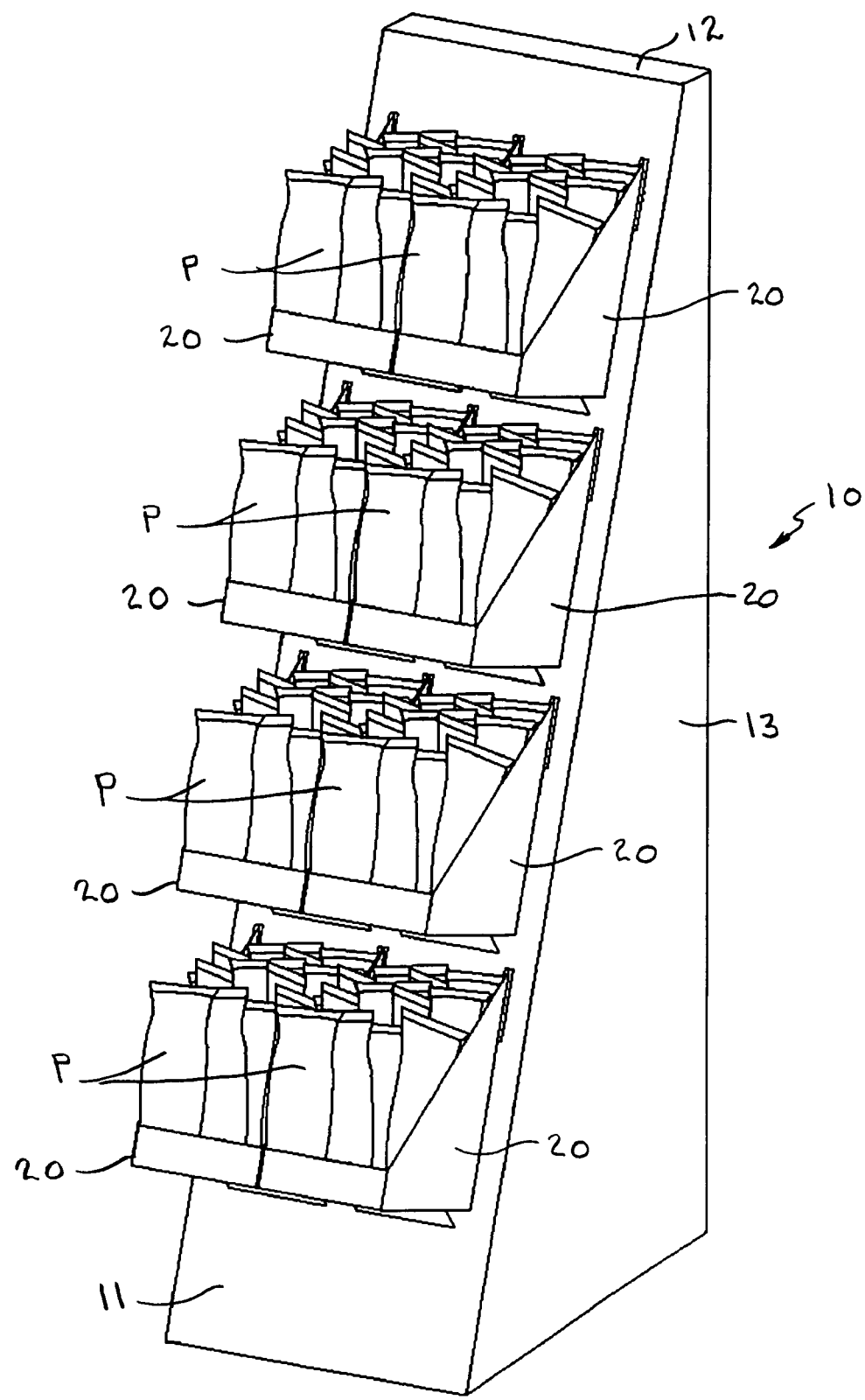
FIG. 1 is a perspective view of a freestanding corrugated cardboard point of purchase display incorporating the system for supporting and displaying products in accordance with the present invention in an assembled condition with a with a plurality of individual product-containing containers supported on the front panel, each filled with a plurality of packaged products.

While this invention is susceptible of embodiment in many different forms, there are shown in the drawings and will herein be described in detail, several specific embodiments, with the understanding that the present disclosure is to be considered as an exemplification of the principles of the invention and is not intended to limit the invention to the embodiments illustrated.

Figure 2:
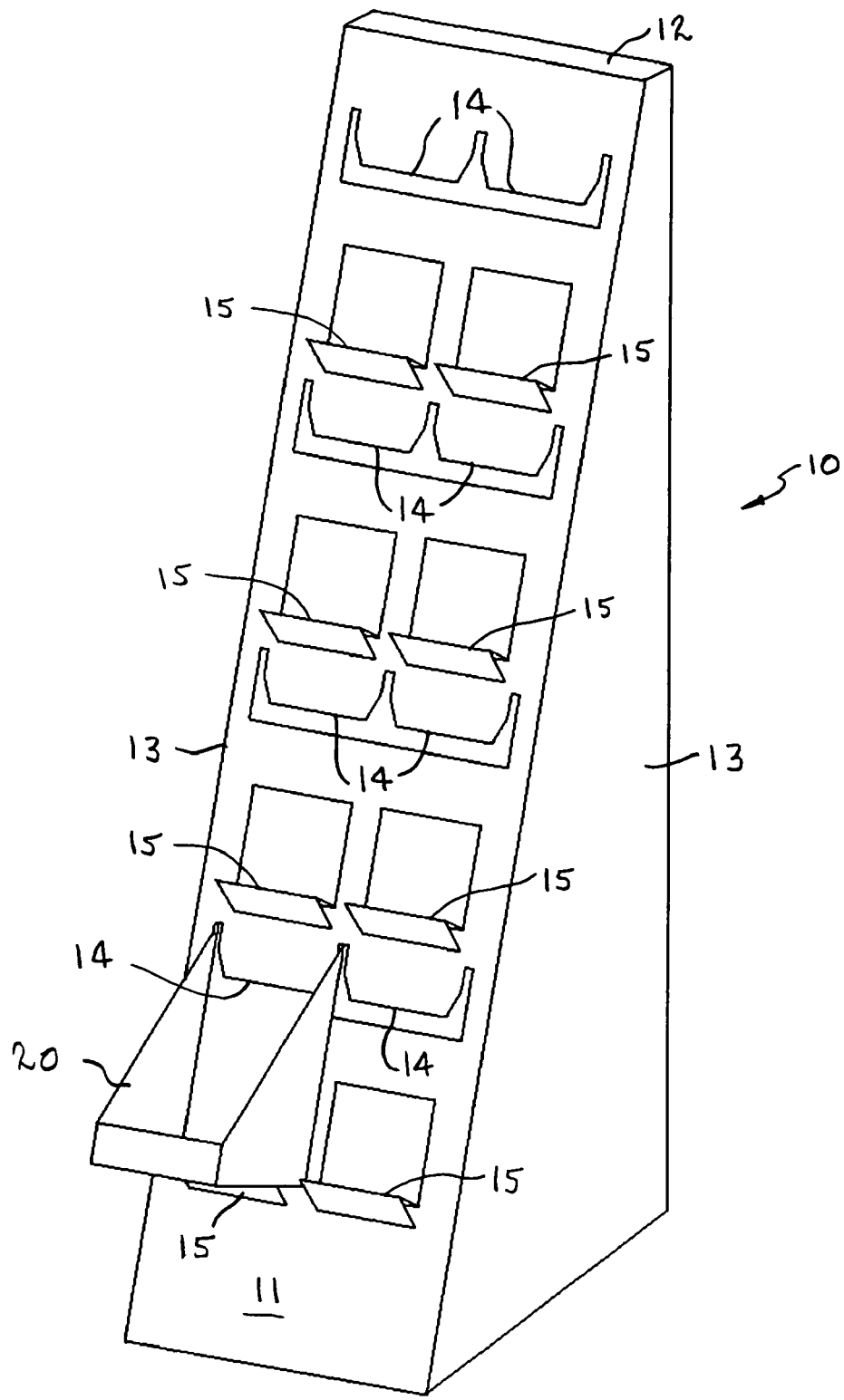
FIGS. 2 and 3 are perspective views of the corrugated cardboard point of purchase display in a partially assembled condition.
Figure 3:
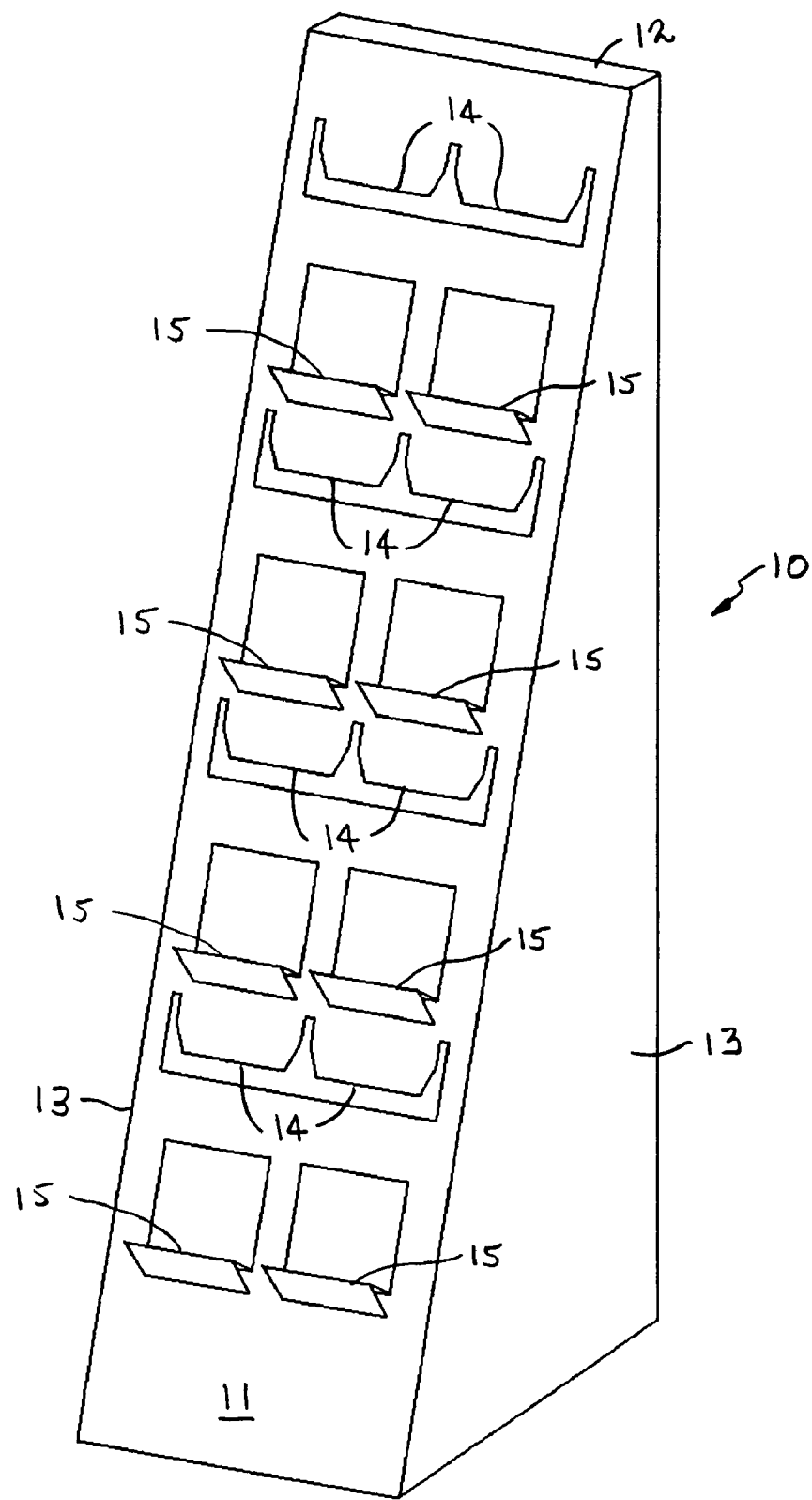

Referring now to the drawings by numerals of reference, FIG. 1 shows a preferred embodiment of a freestanding corrugated cardboard point of purchase display 10 incorporating the system for supporting and displaying packaged goods shown in an assembled condition with a plurality of product containers 20 supported on the front panel, each filled with a plurality of packaged goods P. FIGS. 2 and 3 show the corrugated cardboard point of purchase display 10 in a partially assembled condition. The details of construction of the system for supporting and displaying packaged goods are illustrated in FIGS. 4 through 7.

In the example of the freestanding corrugated cardboard embodiment of the point of purchase display 10, the display is erected from a single sheet or blank of corrugated board which is stamped or die cut from sheets or stock of corrugated paperboard, or the like, and has an initial flat unassembled state and is then folded along predetermined fold lines and erected to form the display, in a conventional manner. When erected, the display 10 forms an elongate generally rectangular central or front panel 11, a top panel 12, and a pair of lateral side panels 13 with a bottom end for supporting the display in an upright position on a horizontal surface, such as a floor. The top panel 12 is folded rearwardly and secured to the top ends of the side panels 13 in a conventional manner. In a preferred embodiment, the width of the side panels 13 increase down the length of the panels so that their bottom ends are longer than the respective top ends and the front panel 11 is inclined rearwardly at an angle relative to a vertical plane, giving the display an overall elongate truncated wedge-shaped configuration. However, it should be understood that the display may have an overall rectangular configuration or other shape.

Figure 5:
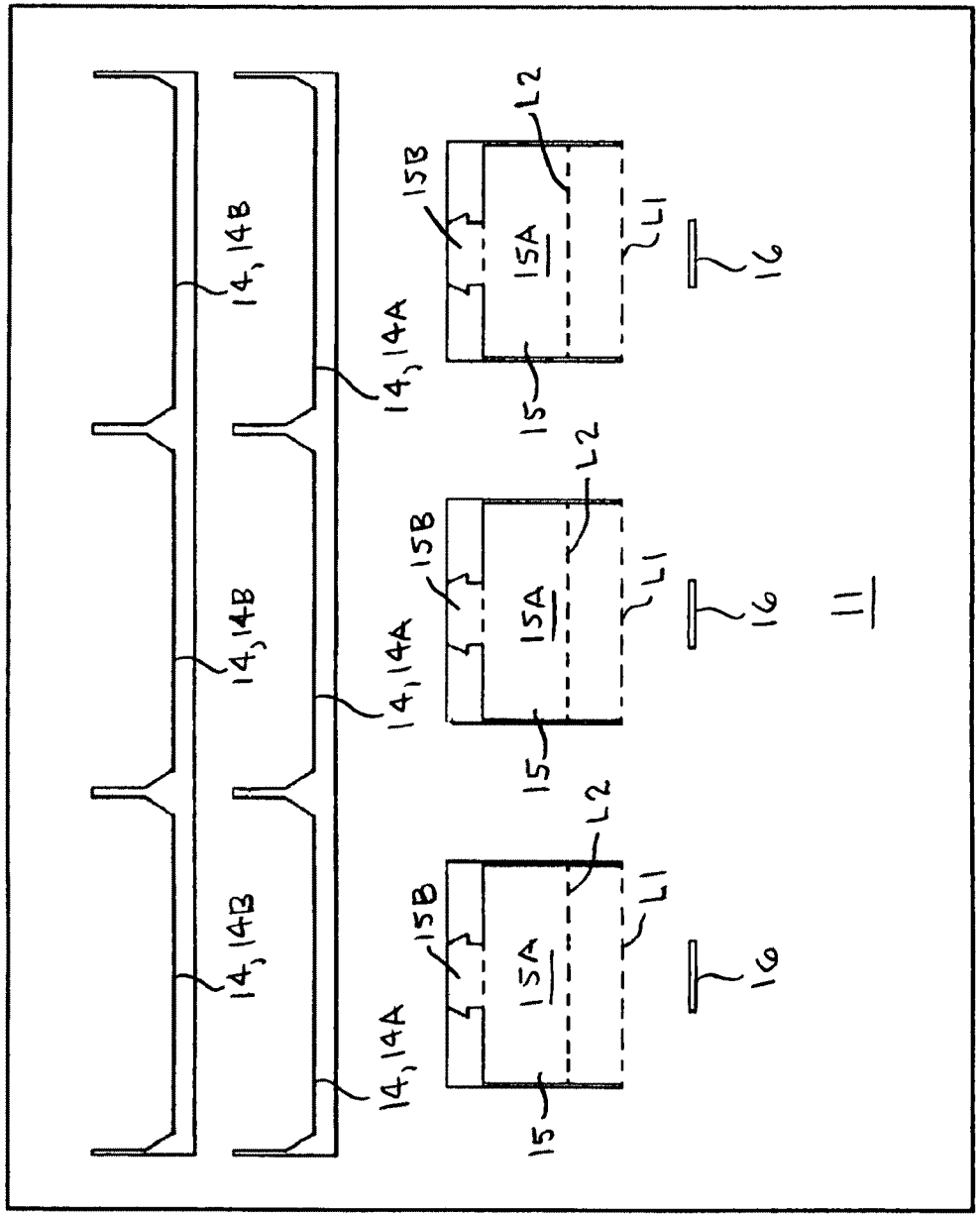
FIG. 5 is a front elevation view of a portion of the front panel surface of the freestanding point of purchase display embodiment, showing a plurality of adjacent pairs of vertically spaced retention tabs, corner support ledge members and lower slots prior to folding the corner support ledge members.
Figure 6:
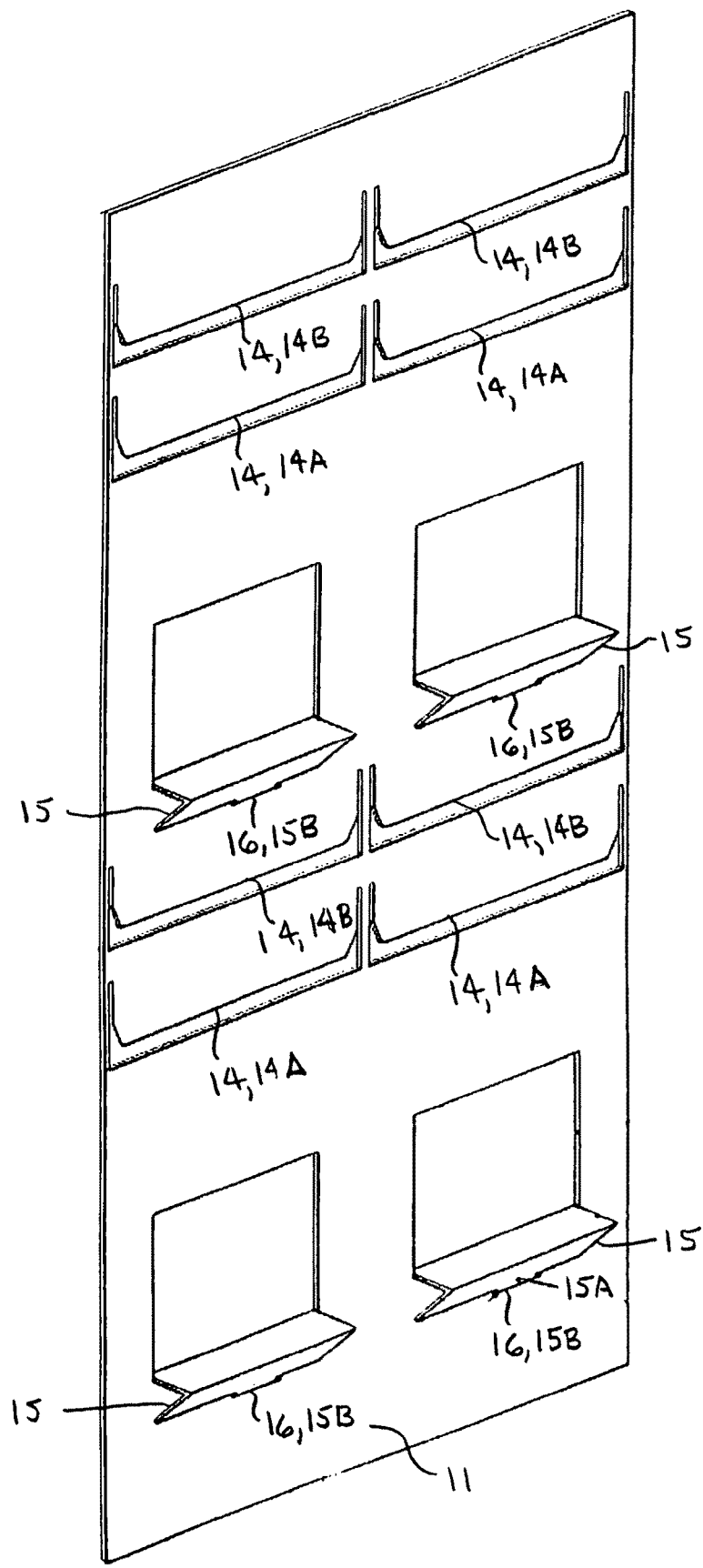
FIG. 6 is a perspective view of a longer portion of the front surface of the freestanding point of purchase display embodiment, showing the corner support ledge members secured into the lower slots in the surface of the freestanding display so as to protrude therefrom.

The freestanding corrugated cardboard embodiment of the point of purchase display 10, departs from conventional corrugated displays in the structure and construction of the front panel 11, as will be now be described in detail with reference additionally to FIGS. 5 through 7.

Figure 4:
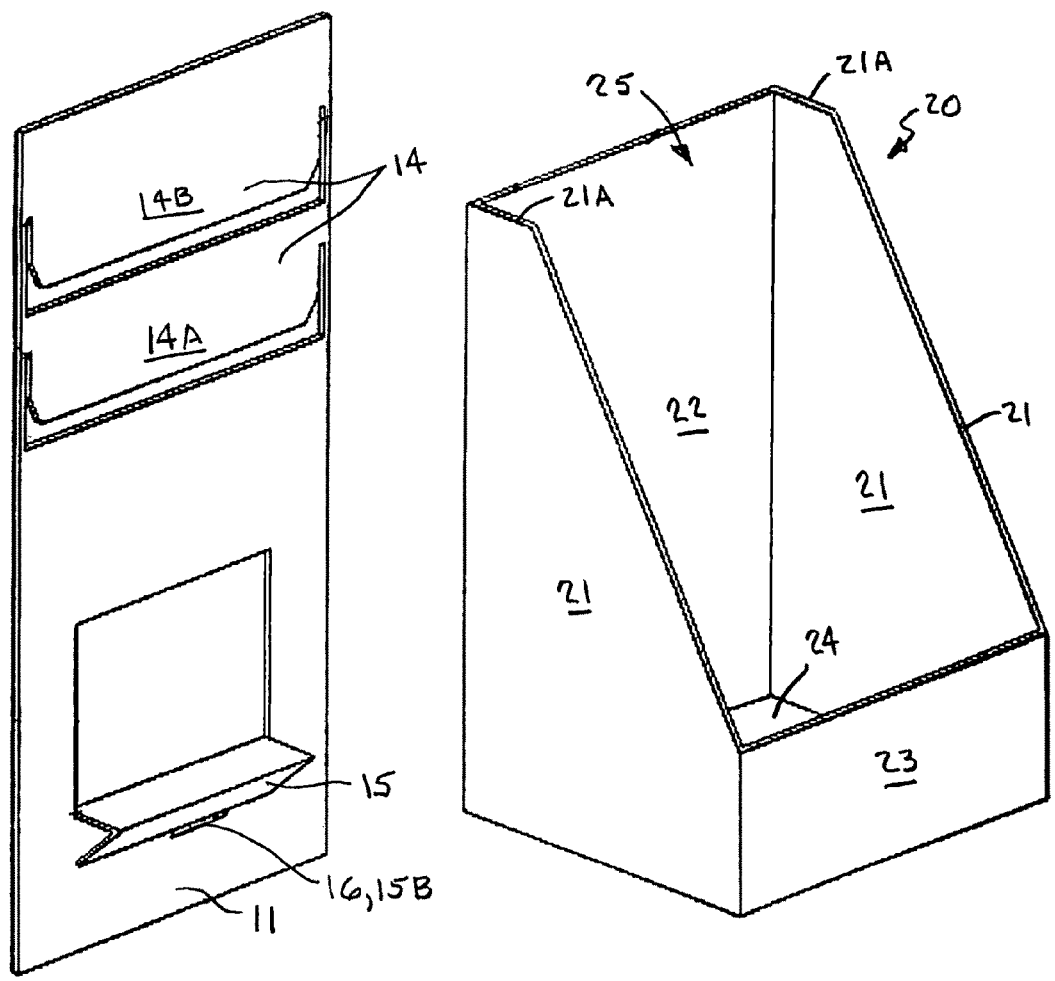
FIG. 4 is an exploded perspective view showing a support portion of the front panel and a product container of the freestanding point of purchase display embodiment of the system in greater detail.

The surface of the front panel 11 is die cut to provide a plurality of adjacent sets of vertically spaced depending upper retention tabs 14, corner support ledge members 15, and lower slots 16 (only one set of which is shown in FIG. 4) which removably receive and support the product container 20. As shown in FIG. 5, the upper retention tabs 14 are each a formed by a horizontal die cut having short laterally opposed upturned ends defining a depending generally rectangular depending retention tab configuration 14 which is separated from the remainder of the front panel along three sides. Two vertically spaced upper retention tabs 14A and 14B may be provided in each set disposed in parallel vertically spaced relation for receiving and engaging containers of different heights (described below).

The corner support ledge members 15 are each formed by die cutting the surface of the front panel 11 to form a upwardly extending generally rectangular portion 15A with a flat generally truncated wedge-shaped locking tab portion 15B which is narrower in width than the rectangular portion and adjoined thereto by a smaller rectangular portion. The bottom of the rectangular portion 15A is adjoined to the remainder of the front panel surface 11 and the wedge-shaped locking tab portion 15B and narrower rectangular portion are separated from the remainder of the front panel along three sides. The larger rectangular portion 15A of the support ledges 15 are each provided with a first score line L1 at its juncture with the front panel 11 and a second score line L2 spaced a short distance above the first score line for folding the initially flat corner support ledges as described below.

The lower slots 16 are die cut in the surface of the front panel 11 a short distance beneath the larger rectangular portion 15A of the corner support ledges 15 and are sized to receive and engage the locking tab portion 15B of the corner support ledges. The initially flat larger rectangular portion 15A of the support ledges 15 are folded outwardly from the front panel 11 along the first score line L1 and folded downwardly and angularly inward along the second score line L2, and then the wedge-shaped locking tab portion 15B is engaged in the lower slot 16. After folding, each corner support ledge 15 has a generally triangular transverse cross section with a flat top surface protruding horizontally outward from the surface of the front panel 11 for supporting a corner of the product container as described hereinafter.

Referring again to FIGS. 4 and 7, the product container 20 is a generally rectangular box-like carton or container having laterally opposed side walls 21, a rear wall 22, a front wall 23, a bottom wall 24, and an open top end 25. The containers 20 may be formed of corrugated paperboard, fiberboard, plastic, metal, or any other suitable stiff or rigid material, and may be opaque or transparent. In the illustrated example, the front wall 23 of the container 20 is smaller in height than the rear wall 22 and the side walls 21 are of a truncated generally triangular configuration with the width of the side walls increasing down the length of the sides to a vertical portion adjoining the front wall 23, defining the open top end 25 for easy access to the contents. However, it should be understood that the containers 20 may be provided with an overall configuration of various other shapes. Each side wall 21 has a short top edge 21A that adjoins opposed ends of the horizontal top edge of the rear wall 22.

Figure 7:
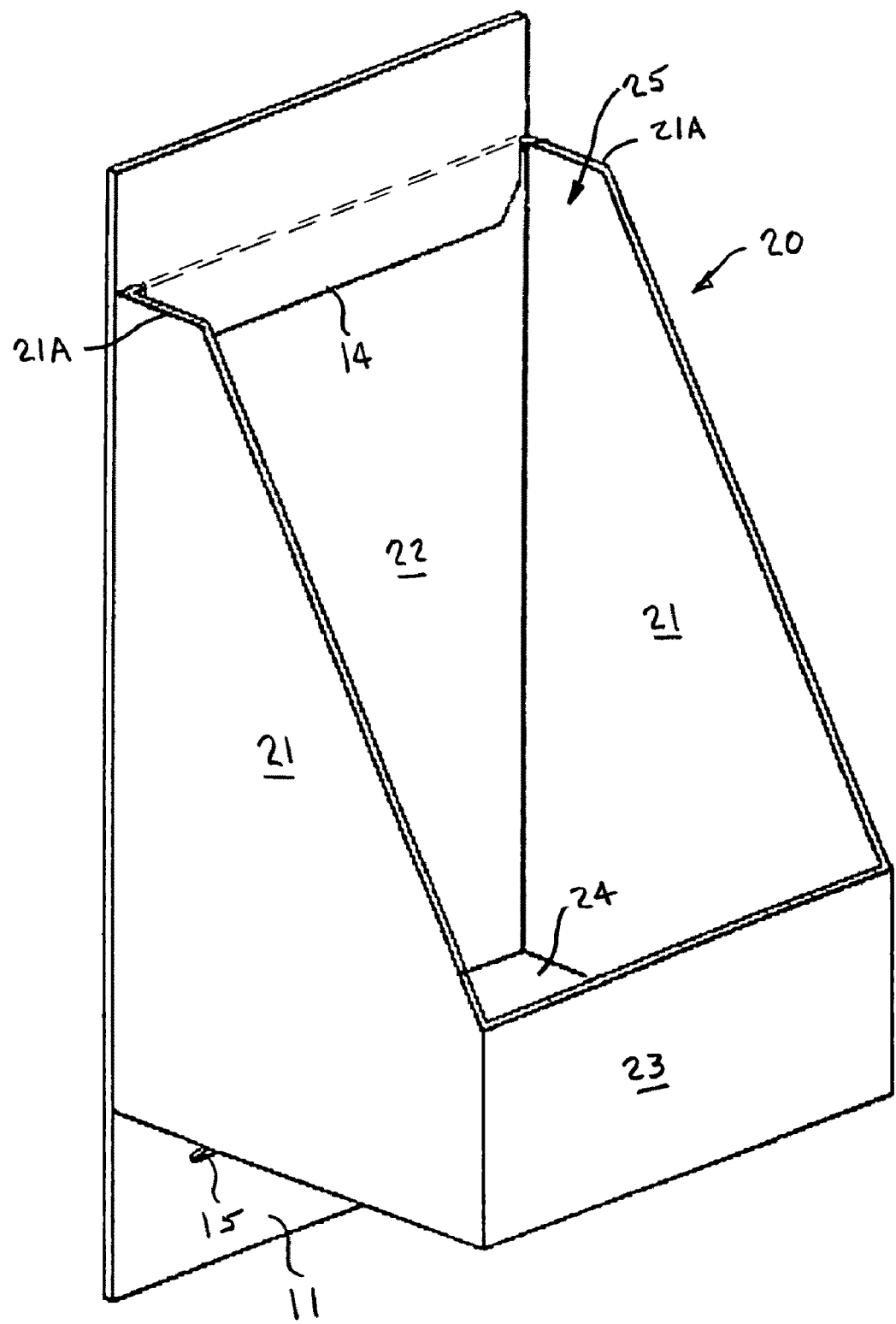
FIG. 7 is a perspective view showing an open top product container having its top end engaged under a retention tab and its bottom corner supported on a corner support ledge member.

As shown in FIG. 7, the product containers 20 are installed on the front panel 11 of the display by inserting and engaging the top end of the rear wall 22 under a respective depending retention tab 14 of the front panel and placing the bottom corner of the rear wall of the container on the corner support ledge 15 such that its bottom end is supported on the outwardly protruding flat top surface of the corner support ledge.

Thus in this manner, a plurality of individual product-containing containers 20 are supported in a secure manner on the front panel 11 of the display. The vertically spaced retention tabs 14A and 14B allow the display to support a plurality of individual product containers which may be of the same size or different sizes, each containing a plurality of products for display and sale. For example, a smaller container having a shorter rear wall may be engaged under the lower retention tab 14A and a container having a longer rear wall may be engaged under the upper retention tab 14B. The containers 20 may also be provided with the products already contained therein, whereby they can be easily and quickly installed and supported on the display in filled condition.

Although the container support system has been shown and described as being incorporated on the front panel of the display, it should be understood, that the structural details described above may also be incorporated into the side panels of the display.

Figure 8:
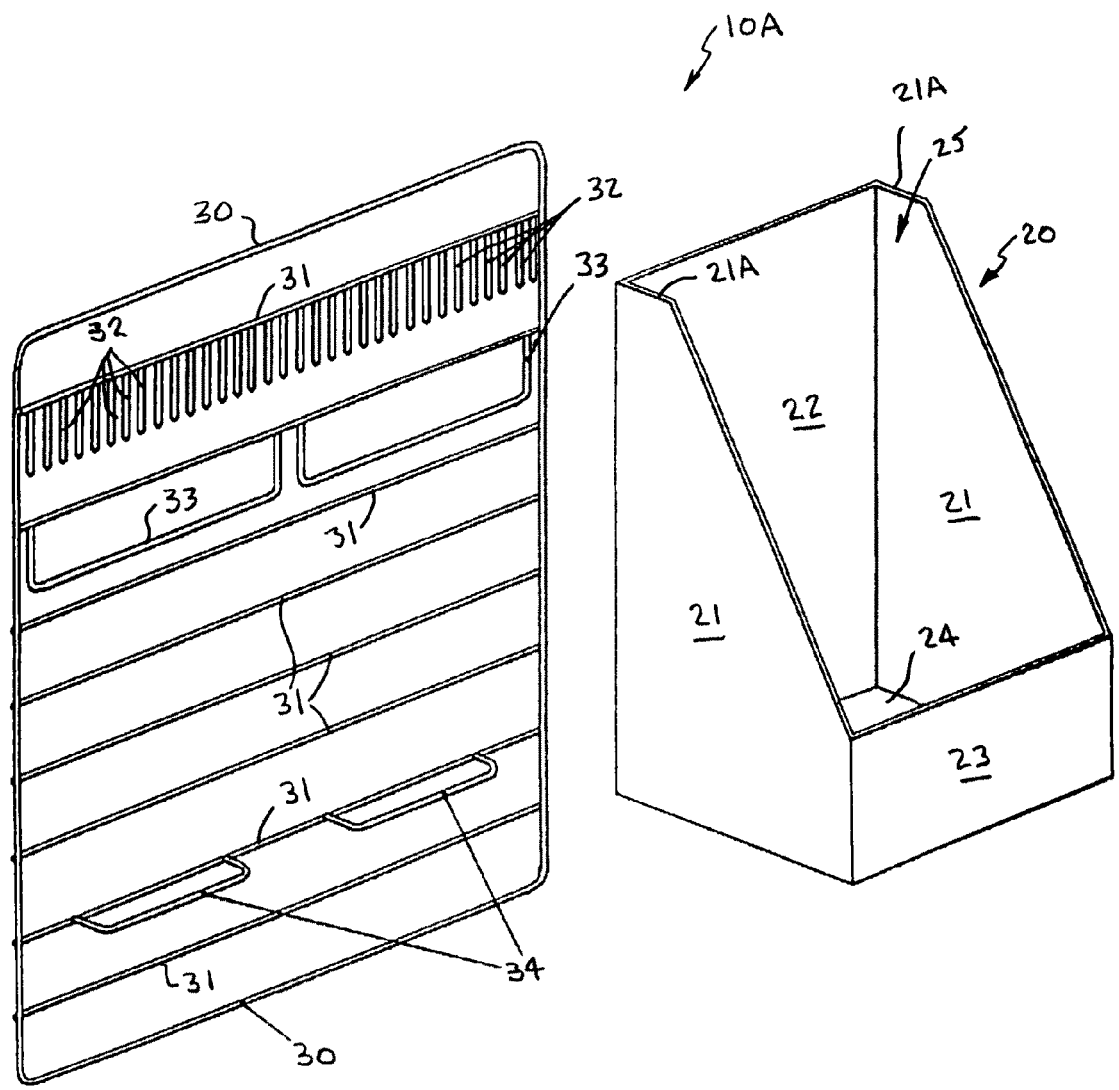
FIG. 8 is an exploded perspective view of a wire frame embodiment of the display system for supporting individual product-containing containers for display and sale of the products contained therein.
Figure 9:
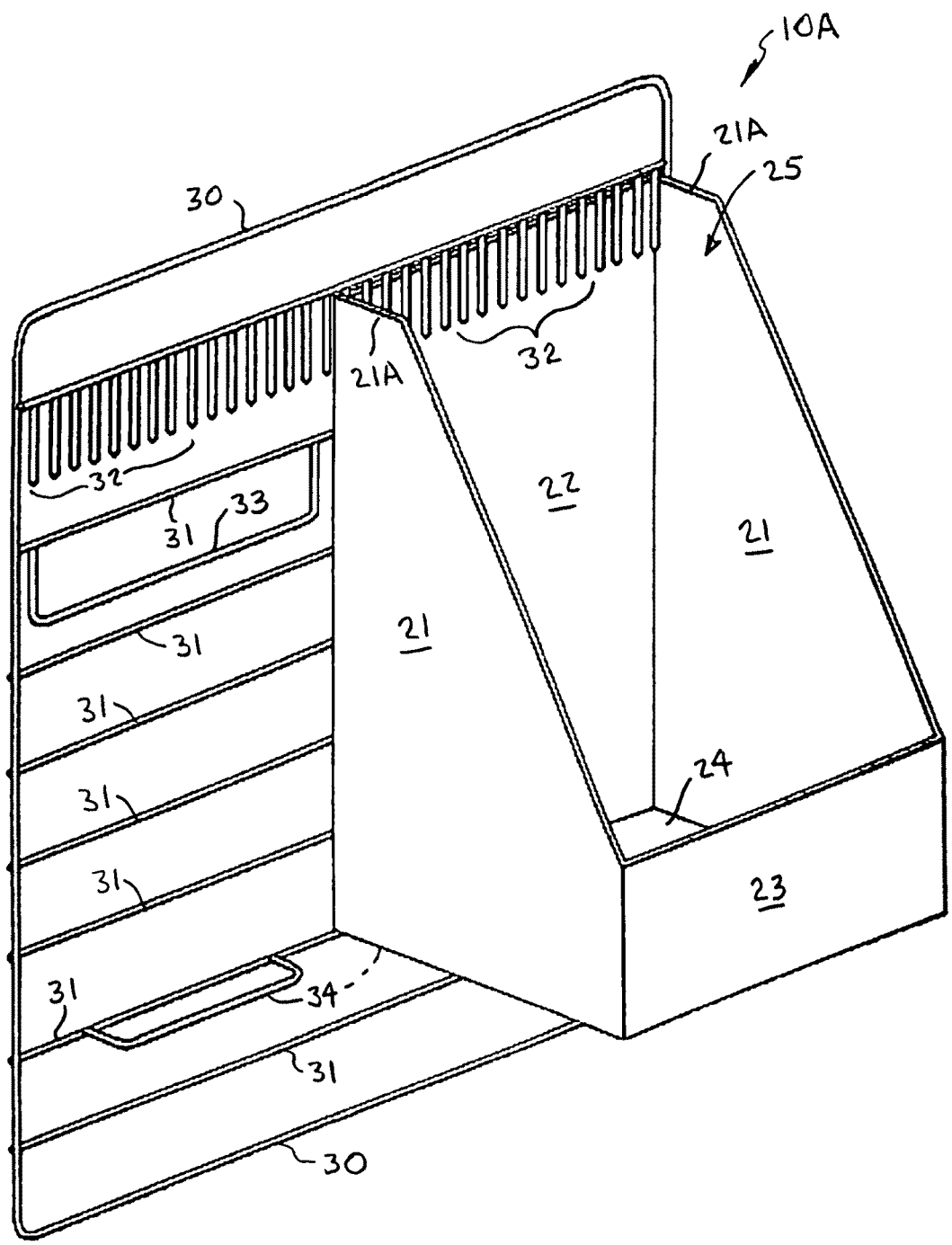
FIG. 9 is a perspective view showing an open top product container having its top end engaged under a short depending wire rod retention member of the wire frame and its bottom end supported on a protruding wire rod corner support member.

Referring now to FIGS. 8 and 9, there is shown a wire frame embodiment 10A of the system for supporting the containers 20. In this embodiment, the wire frame has a generally rectangular outer frame member 30 formed of wire rod, a plurality of parallel vertically spaced wire rod transverse cross members 31 extending between the lateral sides of the outer member, and a plurality of short depending retention members 32 formed of wire rod that depend vertically from an upper transverse cross member in parallel laterally spaced relation. In a preferred embodiment, a second set of retention members in the form of generally U-shaped wire rod members 33 that depend vertically from a second upper transverse cross member 31 are disposed a distance vertically below the first retention members 32 for receiving and engaging containers of different heights. It should be understood that both sets of the retention members may be of the same construction or may be inverted such that the U-shaped retention members 33 are disposed above the short laterally spaced retention members 32.

A pair of generally U-shaped corner support members 34 formed of wire rod each protrude a short distance horizontally outwardly from a lower cross member 31. In this embodiment, the top end of the rear wall 22 of the product container 20 is engaged under or behind a series of the depending retention members 32 and the bottom corner of the rear wall is placed on a respective U-shaped corner support member 34 such that its bottom end is supported on the outwardly protruding corner support member.

Figure 10:
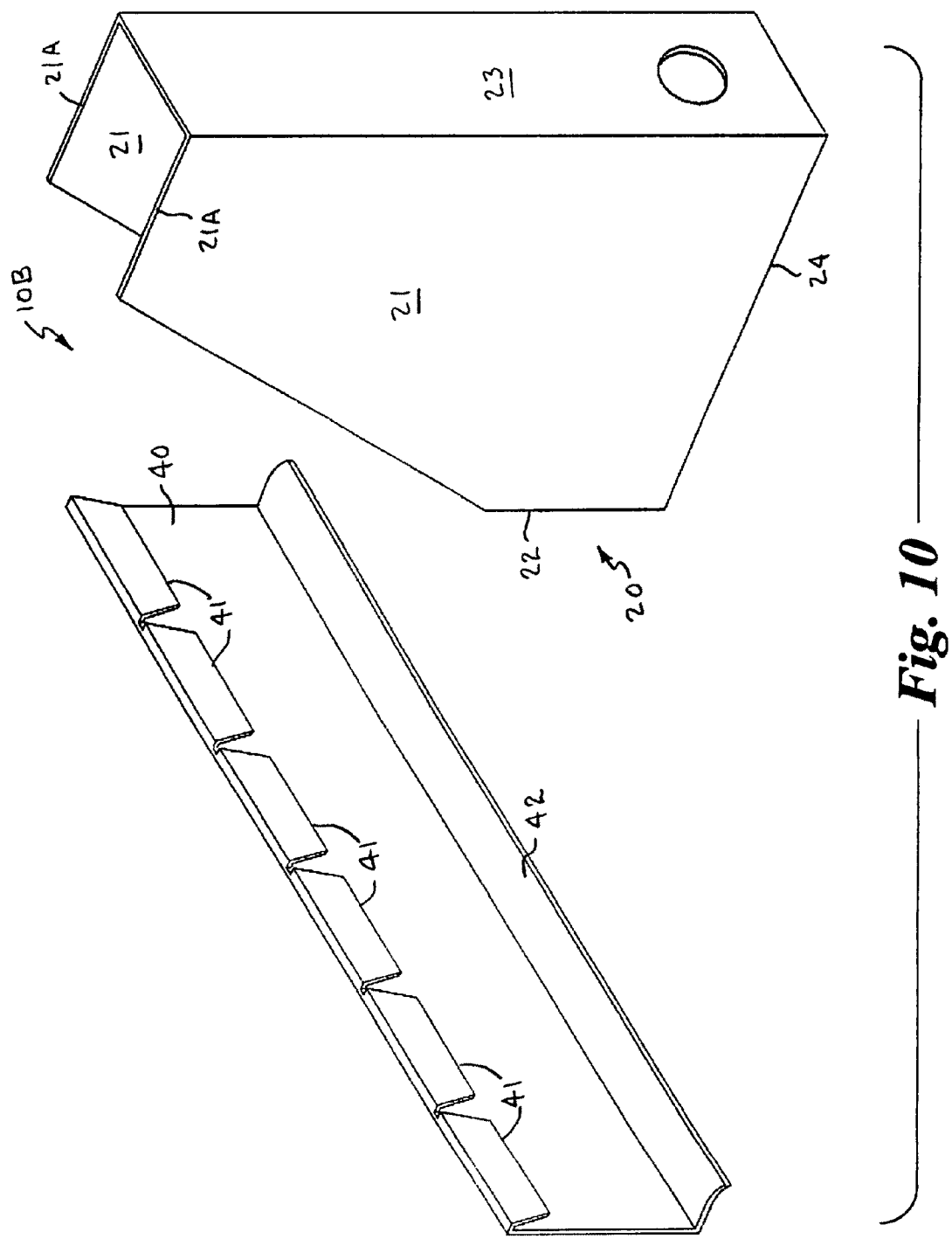
FIG. 10 is an exploded perspective view of a wall supported embodiment of the display and support system for supporting individual product containers and displaying the products incorporating a unitary wall supported channel for supporting the product containers.
Figure 11:
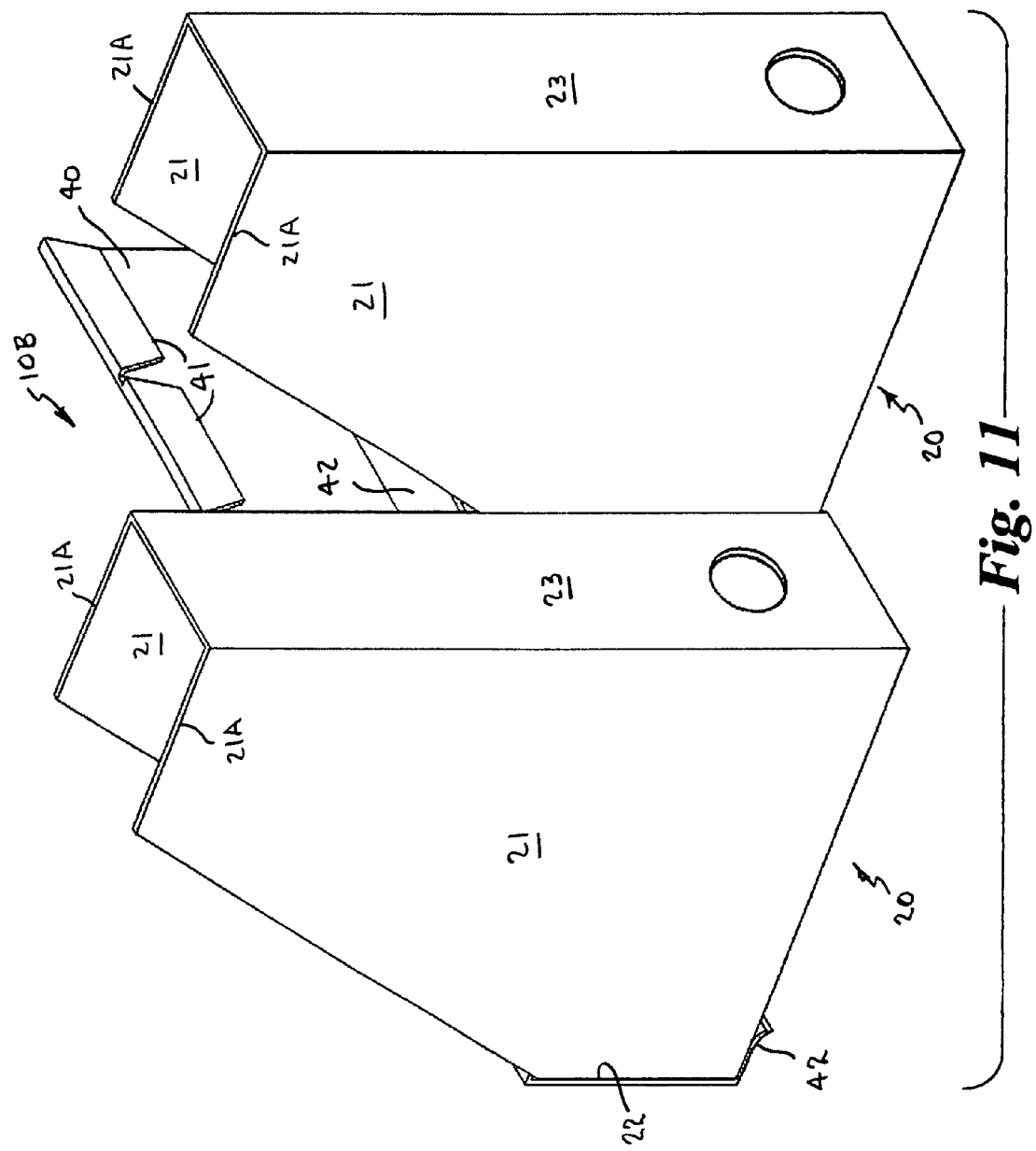
FIG. 11 is a perspective view showing an open top product container having the top end of its shorter end wall engaged under the depending retention tabs of the unitary wall support channel member and its bottom end supported on a protruding corner support flange of the unitary channel.

Referring now to FIGS. 10 and 11, there is shown an embodiment of the display system for supporting the containers 10B incorporating a unitary horizontally supported channel 40 which is attached to a vertical surface, such as a wall or other flat vertical surface. The top of the channel 40 has an inverted generally U-shaped longitudinally extending portion that is bent over and a sort distance vertically downward and a plurality of generally rectangular retention tabs 41 are formed in the vertical surface in laterally spaced relation along the length of the channel. The bottom of the channel 40 has a longitudinally extending generally L-shaped flange or lip 42 that protrudes horizontally outwardly to serve as the corner support surface. In this embodiment, the container 20 has a rear wall 22 that is shorter than its front wall 23. The top end of the rear wall 22 of the container 20 is engaged under a respective depending retention tab 41 at the top of the channel 40 and its bottom corner is supported on the protruding flange or lip 42 of the channel.

Figure 12:
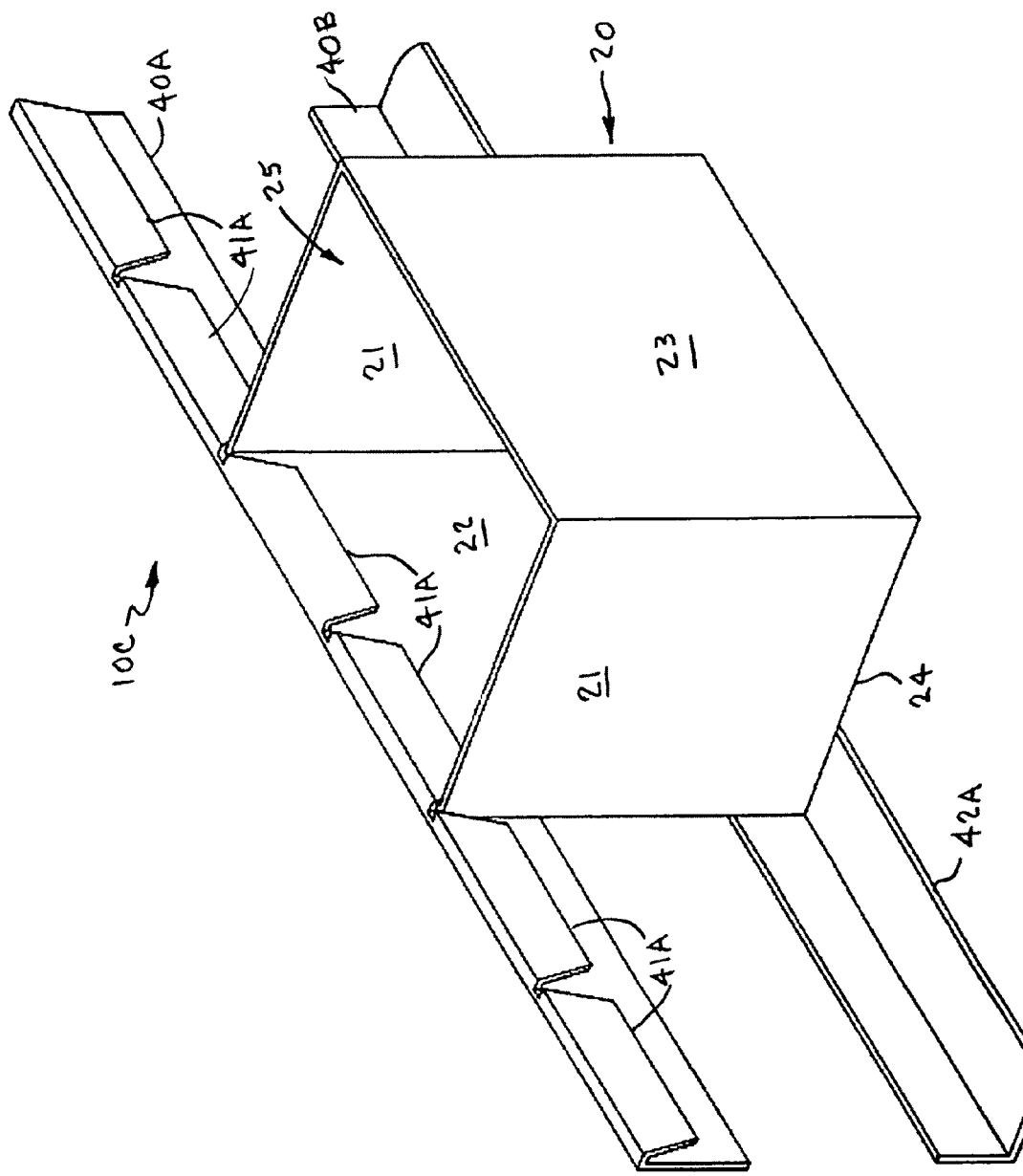
FIG. 12 is a perspective view showing a modification of the wall support channel embodiment incorporating an upper channel member and a lower channel member with the top end of one end wall of an open top product container engaged under the depending retention tabs of the upper channel member and its bottom end supported on the protruding corner support flange of the lower channel member.

FIG. 12 shows a modification of the support channel embodiment wherein the unitary channel described above is replaced by an upper channel member 40A and a lower channel member 40B. The top of the upper channel 40A has an inverted generally U-shaped longitudinally extending portion that is bent over and a sort distance vertically downward and a plurality of generally rectangular retention tabs 41A are formed in the vertical surface in laterally spaced relation along the length of the channel. The lower channel 40B is a generally L-shaped channel having a longitudinally extending flange or lip 42A that protrudes horizontally outwardly to serve as the corner support surface. In this embodiment, the upper and lower channels 40A and 40B may be attached horizontally to a vertical surface, such as a wall or other flat vertical surface, in vertically spaced parallel relation at selected distances apart to receive and support containers having a shorter or longer front or rear wall. As with the previous embodiment, either the top end of the front or rear wall of the container is engaged under a respective depending tab 41A of the upper channel 40A and the bottom corner of the container is supported on the protruding flange or lip 42A of the lower channel 40B.

Figure 13:
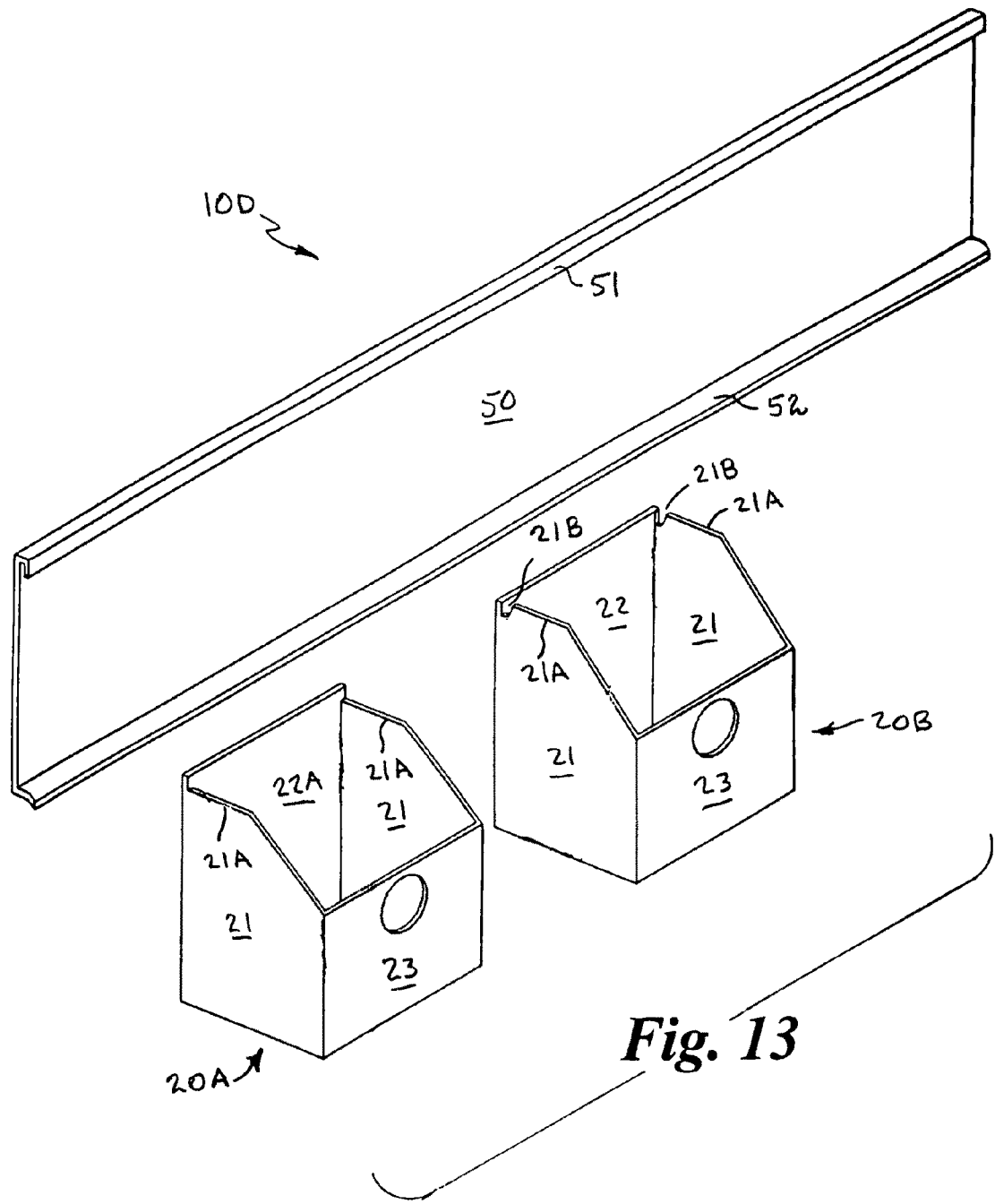
FIG. 13 is an exploded perspective view of a wall supported embodiment of the display system for supporting individual product containers and displaying the products incorporating an extruded unitary wall supported channel wherein the product containers have a back wall adapted to be engaged beneath the depending retention lip of the extruded channel and their bottom corner supported on a protruding corner support flange at the bottom of the extruded channel.

FIG. 13 is an exploded perspective view of a horizontally supported embodiment of the display system for supporting the containers incorporating an extruded unitary wall supported channel 50. The top of the extruded channel 50 has an inverted generally U-shaped longitudinally extending portion that is bent over and a sort distance vertically downward to form a lip 51 that serves as the retention member and the bottom of the channel has a longitudinally extending generally L-shaped flange or lip 52 that protrudes horizontally outwardly to serve as the corner support surface. In this embodiment, modified product containers 20A may be provided with a rear wall 22 that extends a sort distance above the side walls 21, or the containers 20B may be provided with side walls 21 having a short recess 21B adjacent to the rear wall 22. The top end of the rear wall of the container 20A or 20B is engaged under the inverted U-shaped retention lip 51 at the top of the extruded channel 50 and its bottom corner is supported on the protruding corner support flange or lip 52 at the bottom of the channel.

While this invention has been described fully and completely with special emphasis upon a preferred embodiment, it should be understood that within the scope of the appended claims the invention may be practiced otherwise than as specifically described herein.

The invention claimed is:

1. A display support system for releasably supporting product-containing containers for display and sales of the products contained therein, comprising:
    at least one container having an open top end, a generally horizontal bottom end wall, at least one generally vertical side wall having a bottom end adjoined to said bottom end wall defining a bottom corner and said open top end and forming an interior for containing a plurality of products for display; and
    a freestanding product display having an elongate generally rectangular front panel, a top panel, and a pair of lateral side panels, with a bottom end for supporting said display in an upright position on a horizontal surface;
    at least one depending retention member formed in a flat surface of said front panel of said display for releasably receiving and engaging said top end of said at least one side wall of a said container; and
    at least one container support member formed in a flat surface of said front panel of said display disposed a distance vertically below a respective said retention member having a generally triangular transverse cross section with an outwardly protruding flat top surface defining a support surface for receiving and supporting said bottom corner and a portion of said bottom end wall of said container having its said side wall top end engaged with said retention member.

2. The display support system according to claim 1, wherein
    said at least one depending retention member comprises a first depending retention member disposed a distance vertically above a respective said container support member for releasably receiving and engaging said top end of a shorter said container side wall, and a second depending retention member disposed a distance vertically above said first retention member for releasably receiving and engaging said top end of a taller said container side wall.

3. The display support system according to claim 1, wherein
    said at least one depending retention member and said at least one container support member comprise a plurality of sets of said depending retention members and said container support members disposed in parallel laterally spaced relation.

4. The display support system according to claim 1, wherein
    said at least one depending retention member and said at least one container support member comprise a plurality of sets of said depending retention members and said container support members disposed in vertically spaced relation.

5. The display support system according to claim 1, wherein
    said at least one depending retention member and said at least one container support member comprise a plurality of sets of said depending retention members and said container support members disposed in columns and rows in parallel laterally spaced and vertically spaced relation.

6. The display support system according to claim 1, wherein
    said elongate generally rectangular front panel of said freestanding product display is inclined rearwardly at an angle relative to a vertical plane and said display has an overall elongate truncated wedge-shaped configuration.

7. The display support system according to claim 1, wherein
    said display is formed from a single sheet of stiff board material having an initial flat unassembled state and is then folded along predetermined fold lines and erected to form said display.

8. The display support system according to claim 1, wherein
    each said depending retention member formed in said flat surface of said front panel of said display is a generally rectangular tab which is separated from the remainder of said flat surface of said front panel along three sides so as to releasably receive and engage said top end of said at least one side wall of a said container.

9. The display support system according to claim 1, wherein
    each said container support member is formed in said flat surface of said front panel of said display has an initially flat generally rectangular portion and a locking tab portion separated from the remainder of said panel along three sides, and a locking slot formed in said flat surface beneath each said container support member; and
    said initially flat generally rectangular portion is folded along predetermined fold lines and said locking tab is engaged in said locking slot to form said generally triangular transverse cross section having and said outwardly protruding flat top surface of said container support member.

10. The display support system according to claim 1, wherein said at least one container is a generally rectangular container and said at least one side wall comprises a front wall, a rear wall, and a pair of lateral side walls;

said front wall smaller in height than said rear wall and said lateral side walls having a truncated generally triangular configuration adjoining said rear wall and said front wall defining said open top end; and either of said front wall or said rear wall sized and shaped to be slidably engaged beneath a respective said retention member, whereby a respective said container is removably installed on said display by inserting and engaging a top end of either of said rear wall or said front wall under a respective said depending retention member and placing said bottom corner on said outwardly protruding flat top surface of said container support member.

\* \* \* \* \*